(12) United States Patent
Hasegawa

(10) Patent No.: US 6,434,970 B1
(45) Date of Patent: Aug. 20, 2002

(54) PLATE

(76) Inventor: Hiroshi Hasegawa, 1467 W. 178th St., Suite 301, Gardena, CA (US) 90248

( * ) Notice: Subject to any disclaimer, the term of this patent is extended or adjusted under 35 U.S.C. 154(b) by 0 days.

(21) Appl. No.: 09/758,592

(22) Filed: Jan. 10, 2001

(51) Int. Cl.$^7$ .............................. F25D 3/08; A47G 19/00
(52) U.S. Cl. .................... 62/457.6; 219/759; 220/574.2
(58) Field of Search .............................. 62/457.6, 457.4, 62/371; 126/246, 400; 220/574, 574.2, 574.3; 219/730, 732, 759

(56) References Cited

U.S. PATENT DOCUMENTS

| | | |
|---|---|---|
| 1,768,976 A | 7/1930 | Cuthbertson |
| 1,858,728 A | 5/1932 | Creighton |
| 2,561,022 A | 7/1951 | Jones ............................. 65/15 |
| 3,610,459 A | * 10/1971 | Hanson |
| 3,895,691 A | 7/1975 | Shiraishi ..................... 186/1 R |
| 3,901,355 A | 8/1975 | Shiraishi ..................... 186/1 R |
| 3,916,872 A | 11/1975 | Kreis et al. .................. 126/375 |
| 4,349,086 A | 9/1982 | Yamada ........................ 186/49 |
| 4,378,005 A | 3/1983 | Otto ............................. 126/246 |
| D286,250 S | 10/1986 | Prescott ........................ D7/27 |
| D286,360 S | 10/1986 | Trivison ....................... D7/17 |
| 4,982,722 A | 1/1991 | Wyatt .......................... 126/400 |
| D363,644 S | 10/1995 | Wyatt et al. .................. D7/553 |
| D418,018 S | 12/1999 | Winsted .................... D7/553.8 |
| 6,147,337 A | * 11/2000 | Besser ......................... 219/730 |

* cited by examiner

*Primary Examiner*—Chen-Wen Jiang
(74) *Attorney, Agent, or Firm*—Koda & Androlia

(57) ABSTRACT

A plate mainly used for serving sushi on a revolving conveyor in restaurants. The plate is provided with a central recess with an ice disc set inside and covered with a transparent cover that is prevented from falling off the plate accidentally, so that the interior of the plate being carried on the conveyor is kept cool in order to keep the sushi fresh on the plate and prevent the sushi from coming into contact with outside air.

9 Claims, 2 Drawing Sheets

PLATE

BACKGROUND OF THE INVENTION

1. Field of the Invention

This present invention relates to a plate and more particularly to a plate placed on a revolving conveyor for the purpose of serving food to customers in restaurants.

2. Prior Art

It is well known that there are many different types of plates especially for serving food.

Some are designed beautifully for the display of food while others are designed for the sole purpose of serving special types of food. Sushi, being one of the most popular delicacies served in Japanese restaurants, is served on specially designed plates.

There are two types of sushi: Nigiri-zushi being a small piece of rice topped with a slice of fish (cooked or raw) and Maki-zushi consisting of strips of raw fish and/or vegetables rolled in rice and wrapped in a thin crisp sheet of dried seaweed. Inasmuch as raw material is mainly used for sushi, maintaining its freshness and the temperature are very important factors. Normally sushi is served at the counter or sushi bar, as they say. The sushi chef on one side of the counter takes the orders, prepares the sushi and serves it on a plate in front of the customer who sits on another side of the counter.

Recently a few restaurants have attempted to use revolving conveyors installed alongside the counter to serve sushi. This type of revolving food serving system is protected under U.S. Pat. No. 4,349,086. All types of sushi are prepared in advance, and each plate with sushi thereon is placed on the revolving conveyor. The customer selects the plate with the sushi of his liking and partakes of the sushi. This conveyor system is beneficial for both customers and the restaurant. Orders need not be placed by customers each time, and for the restaurant it eliminates the process of taking orders and serving the food thereby reducing costs.

However, the above-described conveyor system has problems. As described above, typical sushi uses uncooked food material such as raw fish. Accordingly, if customers do not find their favorite sushi on the revolving conveyor and do not pick up any, sushi is just left on the revolving conveyor and keeps rotating around the counter many times. Such uneaten sushi is exposed to surrounding air and eventually dries up, deteriorating not only the freshness and taste but also the color. Leaving the raw material food for some time on a revolving conveyer is not preferable in view of sanitation and health of customers.

For this reason and in an effort to comply with the requirements of the sanitation authorities such as the National Sanitization Foundation (NSF) which enforces strict codes for equipment, etc., a few restaurants have attempted to utilize a tunnel-shaped cover for the entire length of the revolving conveyor. Consistent low temperature is maintained for the interior of such a cover and it would also keep out dust, etc. This idea would however be too expensive for restaurants and the interior of the restaurant would probably deteriorate. In addition, it would be difficult for such a cover to maintain the same proper temperature for the sushi. Also to install a cooling system to maintain a certain low temperature would incur additional expenses. The end result is that many of the restaurants have been forced to abandon the idea of serving sushi using this type of revolving conveyor system.

BRIEF SUMMARY OF THE INVENTION

Therefore, the object of the present invention is to solve the problem of the existing system of serving food on conveyors. At the same time, a means must be found to provide a steady and suitable temperature for food on plates protected with a simple structure thereby doing away with covers alongside the sushi counter and at the same time meeting the strict requirements set forth by the sanitation authorities.

Another object of the present invention is to provide the best conditions for serving sushi on plates on a conveyor system.

These goals are attainable by possibly placing an ice disc (about −10° C. to −5° C.) in a centrally located recessed depression of a plate whereby a suitable low temperature can be maintained for the food placed on the plate. The plate with a magnet installed in the bottom will be stabilized on a revolving conveyor. Furthermore, a cover will always keep the food at a desired temperature and prevent the food from being exposed to outside air.

In other words, in the present invention, the plate is provided with a central recess and an ice disc made of material that would change to a solid icy state. The food such as sushi will then be placed on this ice disc with a thin sheet in between whereby suitable temperature can be maintained to preserve the taste and freshness of the food. In addition, a magnet can be attached to the bottom of the plate so that it is attracted to the conveyor's steel chain and become immobile. Furthermore, inside the transparent cover for the plate an ice disc is installed, so that it can efficiently maintain an appropriate low temperature as compared to the outside temperature.

DETAILED DESCRIPTION OF THE INVENTION

Figure 1:
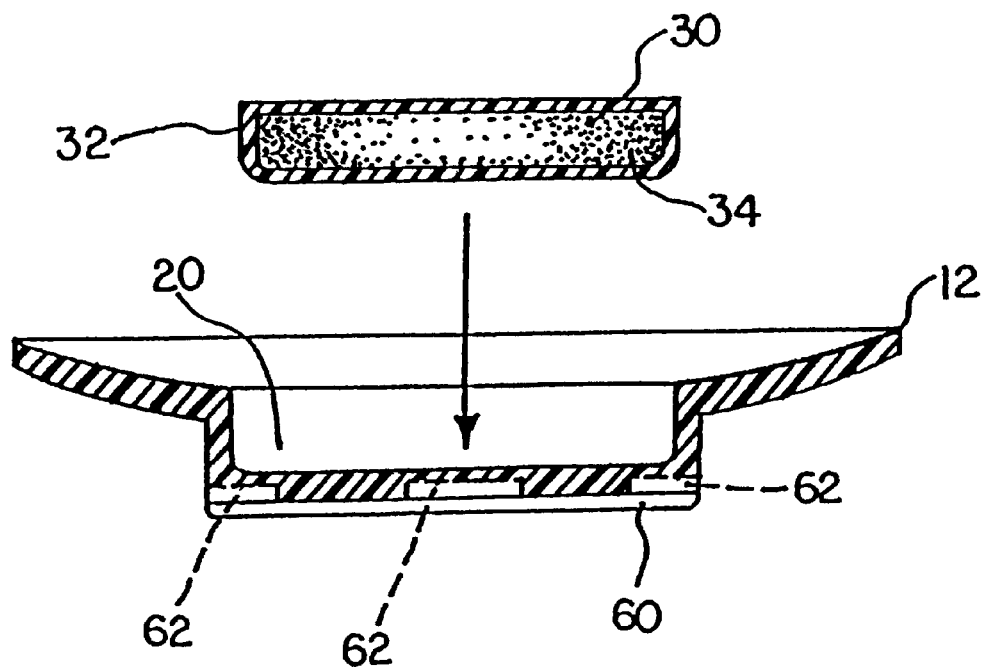
FIG. 1 is a front cross sectional view of the plate of the present invention with ice disc shown above the plate.

The plate of the present invention can be round, oval, square or rectangular. The plate 10 in FIG. 1 is round preferably made of material with thermal conductivity. The plate 10 in FIG. 1 is made of melamine, but could also be made of glass, synthetic resin, etc. This plate 10 will be used for a revolving conveyor alongside the restaurant counter and the size must fit into the width of the conveyor. Typically the diameter of the plate 10 would be about 6–8 inches. The surface of the plate 10 is curved gently in a concave shape so that the outer edge is higher than the center. The center of the plate 10 has a closed bottom recess 20. The center recess 20 will be of any shape in line with the round edge of the plate and has a certain depth. Preferably the diameter of the recess 20 is to be half the diameter of the plate 10 or a little larger. The depth of the recess 20 is about ½ to 2½ inches. The recess 20 can be of any shape but normally should conform to the shape of the plate 10. In the shown embodiment, the recess 20 is round. Preferably the length between the outer edge of the plate 10 and the center of the recess 20 should be equi-distance.

An ice disc 30 is installed in the center recess 20 in a removable fashion. The ice disc 30 is typically made of reusable packed gel-form substance or phase-changing material with the exception of ice. The size of the disc 30 is to fit snugly and completely inside the recess 20 of the plate 10. The ice disc 30 is composed of rigid plastic casing 32 filled with gel-form or phase-changing material 34 which when used in the present invention solidifies at −10° C. to −5° C. when kept in a freezer for a few hours but reverts to its original gel-form in, for instance, one hour after being taken out of the freezer.

Figure 2:
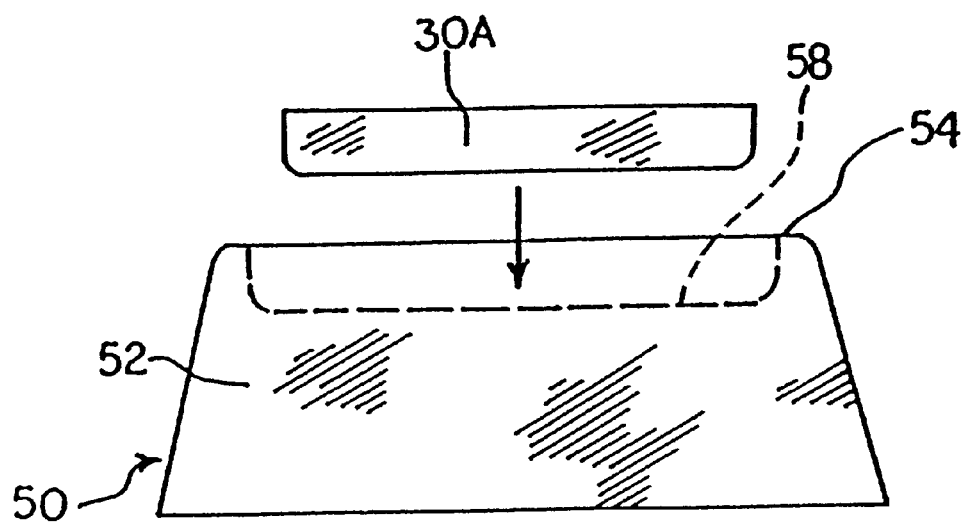
FIG. 2 is a front view of the cover for the plate of FIG. 1.

FIG. 2 shows the transparent cover 50 placed on the plate 10. The U-shaped inverted cover 50 is made of thin synthetic resin such as plastic. The main body 52 of the transparent cover 50 is cone-shaped cylindrical, and the diameter of the bottom is smaller than the plate 10 so that the plate 10 can be held at the edge by hand when the cover 50 is placed on the plate 10. The top 54 closes the top end of the cylindrical main body 52.

The shape of the transparent cover 50 is not limited to a cone-shaped cylinder with a closed end. As long as the cover 50 creates a closed space above the plate 10 without touching any part of the food on plate 10, it can be any shape including an inverted flat V.

A depression 58 for cover 50 can be formed in the center of the top 54. The depression 58 accepts therein a disc-shaped ice disc 30A which is very much the same as the ice disc 30 set in the plate 10. The dimension of depression 58 is set so as to enable the ice disc 30A to be press-fitted inside and held somewhat tightly though still easily removable by hand.

Furthermore, the plate 10 is attached to the bottom with a magnetic sheet 60 which is similar in shape to the outside bottom of the central recess 20 of the plate 10 and secured by glue. The reason for utilizing magnetic sheet 60 is simply due to the fact that the steel chain of the revolving conveyor prevents plate 10 from sliding off the conveyor. Another method is to have magnet 62 embedded in the bottom of the plate 10 thereby preventing any slippage when being carried on the conveyor.

Figure 3:
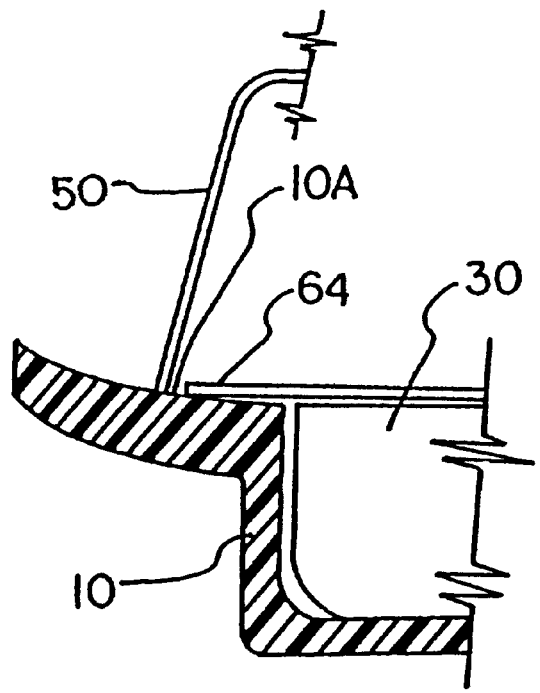
FIG. 3 is an enlarged partial sectional view showing part of the cover and the plate.
Figure 4:
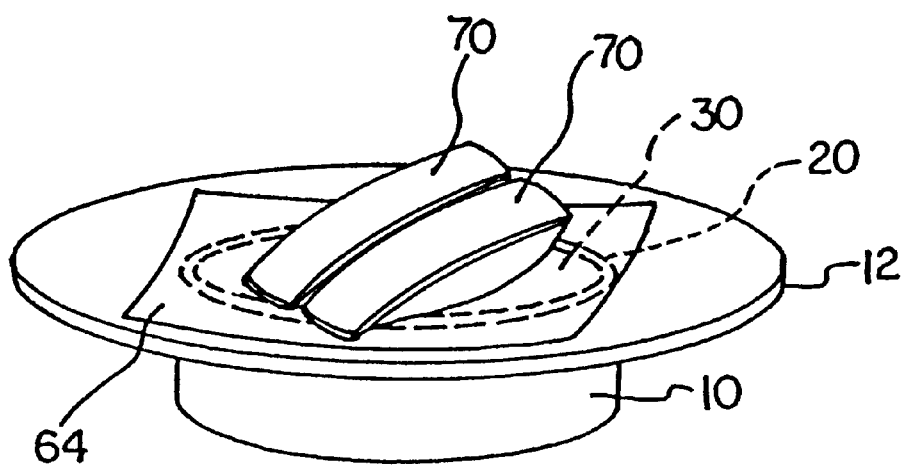
FIG. 4 is a perspective view of the plate of the present invention with sushi on it.

When being put into use, the frozen ice disc 30 is placed in the central recess 20 of the plate 10. Wax paper 64 in FIG. 3 is water-repellent and is used to cover the ice disc 30 and part of the surface 10A of plate 10. A material that would not absorb any water or moisture contained in the food (sushi) would be preferable. The sushi 70 prepared by the chef is placed on the sheet 64 and kept cool by the ice disc 30 utilizing sheet 64. The cover 50 is properly fitted on the plate 10 and then placed on the revolving conveyor.

When the plate 10 is carried on the revolving conveyor, the magnetic sheet 60 prevents any slippage. Furthermore, the ice disc 30A laying in the depression 58 of the cover 50 keeps the interior cooled. In addition, the weight of the ice disc 30A, along with the curved or concave surface 10A, prevents shifting of the cover 50 on the plate 10.

Plates containing different kinds of sushi prepared by the chef are placed on the revolving conveyor one after the other. Customers pick up plates containing only their favorite kind of sushi, remove the cover and consume the sushi. When the sushi is consumed, the plates are collected, the used sheets are discarded, a new sheet is placed on each plate, sushi is placed on the plate, and the customer is served again. The plate can be reused repeatedly until the ice disc returns to gel form thereby necessitating putting it back in the freezer and reused when later frozen.

As seen from above, the present invention is based on NSF standards and keeps the sushi on the plate in a cool form by the ice disc in the plate. Furthermore, the use of the cover keeps the sushi cool from above when the ice disc is placed on top of the cover. Thus, expensive sushi in a display plate can be served to customers fresh, meeting all sanitary and health conditions of the sanitation authorities.

The respective plates for sushi served on a revolving conveyor can be color-coded and/or pattern-coded, each indicating the price of the sushi and making it simple for the customer to keep a tab on the amount eaten. This can be done also by way of designing the plates in different sizes and shapes together with the covers that comply with the sizes and shapes of the plates.

It is apparent that for those skilled in the art the above-described embodiments merely illustrate a few of the many possible specific embodiments representing the applications of the principles of the present invention. Numerous and various other arrangements can readily be devised by those skilled in the art without departing from the spirit and scope of the invention.

What is claimed is:

1. A plate comprising a substantially curved surface, a recess formed in the center of said surface, a reusable ice disc provided in said recess and a removable cover to form an empty space between said cover made of a cylindrical main body with a closed top and an open bottom and said surface of the plate, and wherein the top of the cover is provided with a depression in which a reusable ice disc is placed.

2. The plate according to claim 1 further comprising a magnetic material provided on the bottom of the plate.

3. The plate according to claim 2, wherein the cover is transparent.

4. A plate for use on a revolving conveyor in restaurants to serve food to customers comprising a substantially curved top surface, a recess in the center of the surface, a reusable ice disc to be placed in the recess for keeping food on the plate at a constant low temperature, and a cover having a closed top and open bottom to cover the surface of the plate and wherein the cover is provided with a depression in the closed top and a reusable ice disc is provided in the depression of the cover.

5. The plate according to claim 4, wherein the bottom of the plate is provided with a magnetic material to magnetically hold the plate on a revolving conveyor without ally slippage.

6. The plate according to claim 5, wherein the cover is transparent.

7. A combination plate for use on a revolving conveyor in restaurants to serve food to customers comprising:

a plate body having a substantially concave top surface and a closed bottom recess which is formed in a center of said plate body, said recess having substantially the same circumferential shape as a circumferential shape of said plate body;

a reusable cooling medium removably installed in said recess for keeping food on said plate body at a constant low temperature;

a substantially cylindrical transparent cover with a closed top and an open bottom, said cover being provided with a depression in said closed top and placed on said concave top surface of said plate body so as to cover said food on said plate body; and a reusable cooling medium removably installed in said depression of said cover for keeping food on said plate body at a constant low temperature.

8. The combination plate according to claim 7, further comprising a magnetic material provided in a bottom of said plate body so as to magnetically hold said plate body on said revolving conveyor.

9. The combination plate according to claim 7, further comprising a moisture repelling sheet material set between said food and said cooling medium installed in said recess of said plate body.

* * * * *